(12) United States Patent
Calomme et al.

(10) Patent No.: US 12,551,441 B2
(45) Date of Patent: Feb. 17, 2026

(54) WATER SOLUBLE SILICON-CONTAINING GRANULATE

(71) Applicant: Bio Minerals NV, Destelbergen (BE)

(72) Inventors: Mario Remi Yvonne Calomme, Edegem (BE); Keno Ishihara, Tokyo (JP); Masako Okabe, Kanagawa (JP); Richard Alan Passwater, Berlin, MD (US)

(73) Assignee: Bio Minerals NV, Destelbergen (BE)

( * ) Notice: Subject to any disclaimer, the term of this patent is extended or adjusted under 35 U.S.C. 154(b) by 802 days.

(21) Appl. No.: 17/292,151

(22) PCT Filed: Nov. 11, 2019

(86) PCT No.: PCT/EP2019/080894
§ 371 (c)(1),
(2) Date: May 7, 2021

(87) PCT Pub. No.: WO2020/094886
PCT Pub. Date: May 14, 2020

(65) Prior Publication Data
US 2021/0393528 A1    Dec. 23, 2021

(30) Foreign Application Priority Data

Nov. 9, 2018  (EP) .................................. 18205367

(51) Int. Cl.
| | | |
|---|---|---|
| *A61K 9/16* | (2006.01) | |
| *A23K 20/163* | (2016.01) | |
| *A23K 20/28* | (2016.01) | |
| *A23K 40/10* | (2016.01) | |
| *A23L 33/125* | (2016.01) | |
| *A23L 33/16* | (2016.01) | |
| *A23P 10/20* | (2016.01) | |
| *A61K 33/00* | (2006.01) | |

(52) U.S. Cl.
CPC .......... *A61K 9/1652* (2013.01); *A23K 20/163* (2016.05); *A23K 20/28* (2016.05); *A23K 40/10* (2016.05); *A23L 33/125* (2016.08); *A23L 33/16* (2016.08); *A23P 10/20* (2016.08); *A61K 9/1694* (2013.01); *A61K 33/00* (2013.01); *A23V 2002/00* (2013.01)

(58) Field of Classification Search
CPC .... A61K 9/1652; A61K 9/1694; A61K 33/00; A23K 20/163; A23K 20/28; A23K 40/10; A23P 10/20; A23L 33/125
See application file for complete search history.

(56) References Cited

U.S. PATENT DOCUMENTS

| | | | | |
|---|---|---|---|---|
| 3,515,591 A | * | 6/1970 | Klose ................... | A23L 29/212 |
| | | | | 426/578 |
| 4,702,919 A | * | 10/1987 | Kitamori ............. | A61K 9/5026 |
| | | | | 424/490 |
| 4,985,405 A | | 1/1991 | Gueyne et al. | |
| 8,771,757 B2 | | 7/2014 | Varden Berghe | |
| 8,852,631 B2 | | 10/2014 | Cade et al. | |
| 9,655,860 B2 | | 5/2017 | Cade et al. | |
| 2010/0303737 A1 | | 12/2010 | Hurtig | |
| 2012/0039964 A1 | * | 2/2012 | Beck ...................... | A61K 31/01 |
| | | | | 514/762 |
| 2016/0324766 A1 | | 11/2016 | Stettler et al. | |
| 2021/0023125 A1 | | 1/2021 | Calomme et al. | |

FOREIGN PATENT DOCUMENTS

| | | | | |
|---|---|---|---|---|
| EP | 0743922 A1 | 11/1996 | | |
| EP | 0743922 B1 | 7/1998 | | |
| EP | 1 391 426 A1 | 2/2004 | | |
| EP | 1551763 B1 | 4/2009 | | |
| EP | 3117822 A1 | 1/2017 | | |
| EP | 3396065 A1 | 10/2018 | | |
| EP | 3549578 A1 | 10/2019 | | |
| JP | 2005239653 A | 9/2005 | | |
| JP | 2006117601 A | 5/2006 | | |
| JP | 2008245538 A | * 10/2008 | | |
| WO | 95/21124 A1 | 8/1995 | | |
| WO | 2004016551 A1 | 2/2004 | | |
| WO | 2006082842 A1 | 8/2006 | | |
| WO | WO-2007035431 A2 | * 3/2007 | ........... | A23L 1/0526 |
| WO | 2009018356 A1 | 2/2009 | | |
| WO | 2009127256 A1 | 10/2009 | | |
| WO | 2010092925 A1 | 8/2010 | | |
| WO | 2012032364 A1 | 3/2012 | | |
| WO | 2012035364 A1 | 3/2012 | | |

(Continued)

OTHER PUBLICATIONS

Handbook of Pharmaceutical Granulation Technology (Second Edition, edited by Dilip M. Parikh, 2005, pp. 7-12 and 333-351) (Year: 2005).*
Jivan, M.J., et al., "Preparation of Cold Water-Soluble potato Starch and its Characterization", J. Food Sci. Technol., Mar. 2014, vol. 51(3), pp. 601-605.
"Advanced Collagen Generator Supplement", Mintel, Feb. 5, 2015. [Retrieved from www.gnpd.com, Database Accession No. 2931269].
International Search Report from the International Searching Authority, mailing date of Jan. 3, 2020, for International Application No. PCT/EP2019/080894, pp. 1-3.
Written Opinion of the International Searching Authority, mailing date of Jan. 3, 2020, for International Application No. PCT/EP2019/080894, pp. 1-5.
Jugdaohsingh, R., et al., "Oligomeric but not Monomeric Silica Prevents Aluminum Absorption in Humans", Am. J. Clin. Nutr., Apr. 2000, vol. 71(4), pp. 944-949.

(Continued)

*Primary Examiner* — Alma Pipic
(74) *Attorney, Agent, or Firm* — Buscher Patent PLLC

(57) ABSTRACT

A water-soluble silicon-containing granulate comprising a silicon compound of the formula $Y_xSi(OH)_{4-x}$ or an oligomer thereof, wherein Y is optionally substituted ($C_1$-$C_4$) alkyl, ($C_2$-$C_5$)-alkenyl, ($C_1$-$C_4$)-alkoxy, amino, and wherein x is 0-2, and a cold-water soluble starch material.

19 Claims, 1 Drawing Sheet

(56) References Cited

FOREIGN PATENT DOCUMENTS

| WO | WO-2012102198 A1 * | 8/2012 | ............... A23L 2/42 |
|----|----|----|----|
| WO | 2013/133781 A1 | 9/2013 | |
| WO | 2014006532 A1 | 1/2014 | |
| WO | 2019193200 A1 | 10/2019 | |
| WO | 2020/070300 A1 | 4/2020 | |
| WO | 2020/094886 A1 | 5/2020 | |

OTHER PUBLICATIONS

"Advanced Collagen Generator Supplement", Feb. 5, 2015. [Retrieved from www.gnpd.com, Database Accession No. 2931269].
"Food Supplement", Mar. 3, 2010. [Retrieved from www.gnpd.com, Database Accession No. 1279883].
"E & Selenium Food Complex", Oct. 12, 2009. [Retrieved from www.gnpd.com, Database Accession No. 1192260].
"Bone Collagenizer Ultra Capsules", Oct. 30, 2017. [Retrieved from www.gnpd.com, Database Accession No. 5196303].
"Multi Vitamin Bar", Mar. 16, 2015. [Retrieved from www.gnpd.com, Database Accession No. 3034249].
PCT International Search Report and Written Opinion, PCT International Application No. PCT/EP2019/058802, dated Jun. 24, 2019.
Barel, A. et al., "Effect of oral intake of choline-stabilized orthosilicic acid on skin, nails and hair in women with photodamaged skin," Archives of Dermatological Research, vol. 297, No. 4, pp. 147-153, Oct. 1, 2005.
Lorna Vanderhaeghe [online] retrieved on Jun. 30, 2023 from: https://www.naturallyhealthyniagara.com/pdf/ProductInformationSheet-BioSil.pdf; dated Sep. 27, 2017; 3 pages.
BioSil ch-OSA Advanced Collagen Generator, 30 Vegetarian Capsules [online] retrieved on Jun. 30, 2023 from: https://www.herb.com/pr/ biosil-ch-osa-advanced-collagen-generator-30-vegetarian-capsules/23156; dated Mar. 2010; 8 pages.
M. Biyani, "Choosing Capsules: A Primer," Pharmaceutical Technology 41(10) 2017 pp. 36-41.
BioSil Liquid Capsules ([online] retrieved on Apr. 13, 2022 from: https://www.amazon.com/Capsules-Natural-Factors-Collagen-Generator/dp/B07ZMHLKP9; 2019:12 pages) (Year: 2019).
Rowe, R. C. et al., "Handbook of Pharmaceutical Excipients," Fifth Edition, Pharmaceutical Press, pp. 132-135 and 442-444 (2006).
Examination Report issued in Indian Patent Application No. 202027048003 dated Jul. 7, 2022.
Examination Report issued in European Patent Application No. 18166152.1 dated May 31, 2022.
M. Biyani, "Choosing Capsules: A Primer," Pharmaceutical Technology 41 (10) 2017.
BioSil Liquid Capsules ([online] retrieved on Aug. 8, 2022 from https://www.amazon.com/Capsules-Natural-Factors_Collagen_Generator/dp/B07ZMHLKP9; 2019;9 pages) (Year: 2019).

Iler, R.K., "The Chemistry of Silica—Solubility, Polymerization, Colloid and Surface Properties, and Biochemistry", Iler Handbook, John Wiley & Sons, 1979, pp. 1-15, and 172-189.
Iler, R.K., "The Chemistry of Silica—Solubility, Polymerization, Colloid and Surface Properties, and Biochemistry", Iler Handbook, 1979, pp. 10-13.
Calomme, M.R., et al., "Supplementation of Calves with Stabilized Orthosilicic Acid. Effect on the Si, Ca, Mg, and P Concentrations in Serum and the Collagen Concentration in Skin and Cartilage", Biol. Trace Elem. Res., Feb. 1997, vol. 56(2), pp. 153-165.
Calomme, M., et al., "Partial Prevention of Long-Term Femoral Bone Loss in Aged Ovariectomized Rats Supplemented with Choline-Stabilized Orthosilicic Acid", Calcif Tissue Int., Apr. 2006, vol. 78(4), pp. 227-232, Epub Apr. 13, 2006.
Chiwele, I., et al., The Shell Dissolution of Various Empty Hard Capsules, Chem. Pharm. Bull., Jul. 2000, vol. 48(7), pp. 951-956.
Geusens, P., et al., "A 12-Week Randomized, Double-Blind, Placebo-Controlled Multicenter Study of Choline-Stabilized Orthosilicic Acid in Patients with Symptomatic Knee Osteoarthritis", BMC Musculoskeletal Disorders, Jan. 2017, vol. 18(2), pp. 1-12.
Iler, R.K., "The Chemistry of Silica", John Wiley & Sons, NY, 1979, pp. 1-2, 10-15 and 172-189.
Rabadiya, et al., "A Review: Capsule Shell Material from Gelatin to Non-Animal Origin Material", International Journal of Pharmaceutical Research and Bio-Science, 2013, vol. 2(3), pp. 42-71.
Wickett, R.R., et al., "Effect of Oral Intake of Choline-Stabilized Orthosilicic Acid on Hair Tensile Strength and Morphology in Women with Fine Hair", Arch. Dermatol. Res., Oct. 2007, vol. 299, pp. 499-505.
"Choline-Stabilised Orthosilicic Acid Added for Nutritional Purposes to Food Supplements", The EFSA Journal, 2009, vol. 948, pp. 1-23.
Jivan, et al., "Preparation of cold water-soluble potato starch and its characterization." Journal of food science and technology 51, No. 3 (2014): 601-605.
Spector, T.D., et al., "Choline-Stabilized Orthosilicic Acid Supplementation as an Adjunct to Calcium/Vitamin D3 Stimulates Markers of Bone Formation in Osteopenic Females: A Randomized, Placebo-Controlled Trial", BMC Musculoskeletal Disorders, Jun. 11, 2008, vol. 9(1).
Teughels, W., et al., "Clinical and Microbiological Effects of Lactobacillus Reuteri Probiotics in the Treatment of Chronic Periodontitis: A Randomized Placebo-Controlled Study", Journal of Clinical Periodontology, Sep. 15, 2013, vol. 40(11), pp. 1025-1035.
International Search Report from the European Patent Office, mailing date Dec. 17, 2019, for International Application No. PCT/EP2019/076944, pp. 1-5.
Written Opinion of the International Searching Authority, mailing date Dec. 17, 2019, for International Application No. PCT/EP2019/076944, pp. 1-11.

* cited by examiner

WATER SOLUBLE SILICON-CONTAINING GRANULATE

CROSS-REFERENCE

This application is a 371 U.S. national phase of PCT/EP2019/080894, filed Nov. 11, 2019, which claims priority from EP patent application Ser. No. 18/205,367.8, filed Nov. 9, 2018, both which are incorporated by reference in its entirety.

FIELD OF THE INVENTION

The invention relates to a formulation comprising a silicon compound in bioavailable form, a preparation method thereof and the use thereof.

BACKGROUND

The bioavailable form of the mineral silicon is orthosilicic acid (OSA) which is chemically stable in dilute concentrations i.e. <10-3 M (Iler 1979). At higher concentrations, polycondensation of OSA occurs resulting in the formation of oligomers and polymers. These polycondensated forms of the monomer are not absorbed by man (Jugdaohsingh et al. 2000) but should be converted by stomach acid into OSA to enable absorption in the gastro-intestinal tract. In order to inhibit said polycondensation a stabilizing agent may be used. The result is a silicic acid in bioavailable form, also known as bioavailable silicon compound. Monoalkyltrisilanol compounds such as monomethyltrisilanol have also been proposed as bioavailable silicon compounds.

Both liquid and solid formulations of stabilized silicic acid have been invented by the present applicant and developed into commercially available products. A liquid formulation is disclosed in EP0743922 and a solid formulation, prepared by means of extrusion-spheronisation technology, is disclosed in EP1551763. The solid formulation is in the form of beadlets with a particle size between 800-1200 μm which are used to fill hard capsules. These products have been tested in a variety of clinical trials in which beneficial results were found on bone, cartilage, hair, nails and skin. It has also been found that after oral intake of stabilized silicic acid, the ingested silicon compound is primarily found as orthosilicic acid in blood and urine.

It would be desired to provide a solid formulation of bioavailable silicic acid suitable for food, feed and pharmaceutical applications) wherein the dosage is predefined, that can easily be solubilized with liquid or beverage into an easy to drink preparation with low viscosity. Such a formulation would contribute to patient compliance and facilitates use thereof, when patients are travelling. The solid formulation could also be blended with other nutrients, flavors and/or sweeteners without the risk of segregation and could also replace the beads made with extrusion-spheronisation technology.

SUMMARY OF THE INVENTION

It is a first object to provide such improved solid formulation comprising a bioavailable silicon compound.

It is therefore a first object of the invention to provide a manufacturing method for an improved solid formulation of a bioavailable silicon compound.

It is a further object of the invention to provide a dosage form that can be solubilized in a liquid and wherein the effective dosage is predefined.

It is a again further object of the invention to provide use as a food or feed supplement.

It is another object of the invention to provide the formulation for use as a medicament.

The first object is achieved in a water-soluble silicon-containing granulate comprising (1) a silicon compound of the formula $Y_xSi(OH)_{4-x}$ or an oligomer thereof, wherein Y is optionally substituted (C1-C4)-alkyl, (C2-C5)-alkenyl, (C1-C4)-alkoxy, amino, and wherein x is 0-2, and (2) a cold-water soluble starch material.

The second object is achieved in method for the provision of the water-soluble silicon-containing granulate of the invention, comprising the steps of Providing a liquid formulation of a silicon compound of the formula $Y_xSi(OH)_{4-x}$ or an oligomer thereof, wherein Y is optionally substituted $(C_1-C_4)$alkyl, $(C_2-C_5)$-alkenyl, $(C_1-C_4)$-alkoxy, amino, and wherein x is 0-2, and preferably x=0;

Providing a cold-water soluble starch material, and

Mixing the liquid formulation and the cold-water soluble starch material, so that the silicon compound adsorbs onto the starch material and silicon containing granules are formed.

The first object is also achieved in a granulate obtainable by the method of the invention The further objects are achieved in a galenic or nutritional composition, such as a dosage form or package comprising the granulate of the invention, in the use thereof as food supplement or feed supplement, and in the granulate for use in the prevention, inhibition and/or treatment of bone-loss and cartilage degeneration related diseases, loss of hair nail quality, alopecia, and skin ageing diseases.

The further object is moreover achieved in a method of prevention, inhibition and/or treatment of bone-loss and cartilage degeneration related diseases, loss of hair nail quality, alopecia, and skin ageing diseases comprising the use of the water-soluble silicon-containing granulate of the invention, and/or any dosage form or package comprising said granulate. In one preferred embodiment, the granulate or the solid dosage form therewith, is dissolved or dispersed into a beverage prior to oral administration thereof to a consumer or patient.

BRIEF DESCRIPTION OF THE DRAWINGS

These and other aspects of the invention will be further elucidated with reference to the Examples and Figures, wherein.

DETAILED DESCRIPTION OF THE INVENTION

Figure 1A:
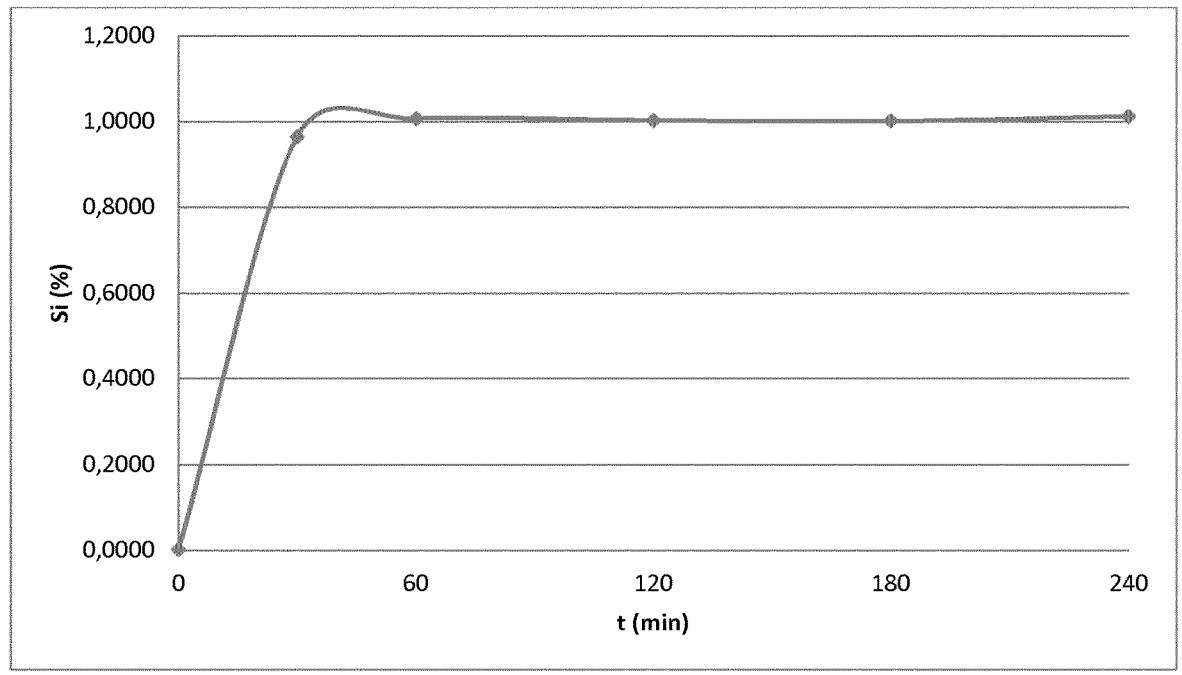
FIG. 1A shows the silicon concentration of dissolution medium measured by GFAAS (elemental silicon). 500 mg stabilized silicic acid granules (lot I-160713) are incubated in a dissolution apparatus, using 500 ml dissolution medium, at 37° C. and 1000 rpm mixing speed. The silicon concentration after 240 minutes is 1.01% (GFAAS) w/V.

The inventors of the present invention have found out that water-soluble granulates containing a silicon compound, such as orthosilicic acid or its oligomers can be prepared, by mixing a liquid formulation of the silicon compound with a cold-water soluble starch material. This is a practical method, which avoids the use of a separate binder solution for the solid parts entered into the granulation process. Beyond that, the granulate is a suitable form for integration with other nutrients and/or solid food products. Furthermore, the resulting granulate turns out to be highly advantageous, as customers or patients may dissolve the granulate into a beverage prior to use. Herein, the taste of the silicon compound is suppressed by the beverage taste. And it has come as a surprise to the inventors that the silicic acid in the granulate does not further polymerize into a form that cannot be absorbed anymore in the gastro-intestinal tract.

The term 'cold-water soluble starch' is known per se in the field of starches, and relates to starch materials that when added to water at ambient temperature manifests a complete disruption of the granular structure and the formation of a colloidal dispersion, or even a solution or an apparent solution. Non-limiting examples of modification treatment are esterification, possibly in combination with salt formation; alcohol-alkali treatments, such as for instance disclosed in M. J. Jivan et al, J. *Food Science Technology* (March 2014), 51(3), 601-605; mixing of starch in aqueous alcohols under high temperature and pressure; starch hydrolysis using a mixture of sodium hydroxide and urea as hydrolytic agent; dextrinification.

Suitably, the modified starch material has a solubility percentage of at least 50 wt % at room temperature (25° C.), more preferably at least 60 wt %, or even at least 70 wt %. The solubility percentage is measured on the basis of 1 wt % aqueous suspensions of the modified starch generated by mixing at 1,000 rpm at room temperature using a rotary shaker for 45 minutes. The supernatant is separated off from the suspension using a centrifuge treatment (1,200 g speed for 15 minutes), and subsequent drying of the supernatant (6 hours, 105° C.). The solubility percentage is calculated as the ratio of the solid mass in the supernatant and the mass of the sample, multiplied by 100%.

Preferred carrier materials include one or more chemically modified starch material, such as dextrin, acid-treated starch, alkaline-modified starch, bleached starch, oxidized starch, enzyme-treated starch. A preferred class of modified starch materials are the esterified starches, such as monostarch phosphate, distarch glycerol, distarch phosphate esterified with sodium trimetaphosphate, phosphated distarch phosphate, acetylated distarch phosphate, starch acetate esterified with acetic anhydride, starch acetate esterified with vinyl acetate, acetylated distarch adipate, acetylated distarch glycerol, starch sodium octenyl succinate and/or combinations thereof. Hydroxypropyl starch, hydroxypropyl distarch phosphate, hydroxypropyl distarch glycerol may also be suitable. The modified and esterified starches may further be used in the form of salts, such as sodium salts.

More preferably, a combination of a first and a second modified starch materials is used, wherein for instance the first modified starch material has a higher molecular mass than the second starch material. Good experimental results have been obtained herewith. Most suitably, both modified starch materials are so-called cold-water soluble starches. It is found experimentally that the second starch material can add in the formation of a granulate of which at least 80 wt %, preferably at least 90 wt % has a size in the range of 100-600 μm, and particularly to reduce the amount of granules smaller than 100 μm. A preferred combination is that of an esterified starch and a dextrin or maltodextrin. The esterified starch is more preferably a salt. A most preferable combination is that of a sodium starch octenyl succinate and dextrin. It is deemed preferable that the mass ratio of the first modified starch is present in an amount of 50-75% and second modified starch in an amount of 25-50 wt %. More preferably, the mutual weight ratio of the first and the second modified starch is between 1.5 and 2.5, such as 1.8-2.2.

The starch material may have any desired origin, including for instance wheat starch, maize starch, corn starch, potato starch, cassava starch, tapioca starch. Where a first and a second modified starch are used, there is no need that both originate from the same source of starch.

Preferably, the silicon compound is used in combination with a stabilizing agent inhibiting polymerization of the silicon compound. The inhibition is more particularly such that the formation of water insoluble and no longer hydrolysable silicon polymers is prevented. Such silicon polymers are not bioavailable, i.e. consumption thereof does not allow the body to absorb silicon in a form ready for absorption, which is particularly the silicic acid monomer orthosilicic acid, oligomers thereof and presumably certain variations thereto, such as silanols and silicates. Stabilization can be obtained by use of amino acids, other organic acids such as salicylic acid, sorbitol acid, ascorbic acid, lactic acid and caproic acid, peptides, carnitine, phenolic or polyphenolic compound such as vanillin (4-hydroxy-3-methoxybenzaldehyde), quaternary ammonium compounds, such as betaine and choline and derivatives thereof. The choline compound is preferred, and is for instance chosen from choline chloride, choline bitartate, choline hydroxide, choline dihydrogen citrate, choline 2-4-dichlorophenoxyacetate (2,4 D choline salt), choline acetate, choline carbonate, choline citrate, choline tartate, choline lactate, choline dibutyl phosphate; choline O,O'-diethyl dithiophosphate, choline dihydrogen phosphate; choline phosphate.

Good results have been found with choline chloride. When the stabilizing agent is a quaternary ammonium compound such as choline chloride, the liquid preparation is characterized by a bad taste and unpleasant odor which can be described as fishy and bitter and which has a negative impact on the product's compliance. The use of carriers such as microcrystalline cellulose to obtain a solid pelletized preparation or liquid filled polysaccharide capsules, overcomes this problem. However, both these solid dose preparations are not water soluble. The use of the solid formulation of the present invention overcomes this disadvantage.

In a most preferred embodiment, the silicic acid compound is the silicic acid monomer known as orthosilicic acid, and/or oligomers thereof. This corresponds to a value $x=0$ in formula (I). The bioavailability of orthosilicic acid has been proven directly in a plurality of scientific studies, which has also been acknowledged by the European Food Safety Authority (EFSA). It is moreover a natural ingredient as compared to monomethyltrisilanol, which does not occur in nature but is a man-made synthesized compound.

Preferably, in the invention, the silicic acid substantially comprises oligomers and/or monomers of orthosilicic acid. The oligomers are for instance oligomers comprising less than 1000 monomers, preferably less than 100 monomers per molecule. More preferably, the oligomers are such that at least 80% and preferably at least 90% of the silicon atoms are herein bonded to at most 3 other silicon atoms via a silicon-oxygen-silicon bridge. The term substantially herein suitably refers to at least 95 wt %, preferably at least 98 wt %, more preferably at least 99 wt %. Silicic acid preparations that are polymerized merely to an extent that hydrolysis thereof into monomers, dimers and trimers is feasible in the gastro-enteric tract, are called bioavailable silicon. Silicic acid of such preparations can be absorbed by the human body.

In an alternative embodiment, use is made of a trisilanol compound as the silicon compound, such as monomethyl-trisilanol. This corresponds to the option of x=1 in formula I. The trisilanol compound may further be used in a blend of silicon compounds according to formula (I) with x=0-2, and preferably x=0, 1. One preferred side group Y is C1-C4 alkyl, such as methyl.

As a further preference, the solid formulation is particulate wherein at least 80 wt % of the particles has a size in the range of 100-800 µm, as measured by means of sieve analysis. Sieve analysis of a preferred example indicates the feasibility to arrive at a distribution such that 90% of the granules are smaller than 600 µm. Optionally, sieving may be applied to select a fraction of granules with a specific, narrow particle size distribution or to remove particles with a size >600 µm. More preferably, the particle size distribution is such that a fraction with particles smaller than 100 µm accounts for at most 15 wt % of the particles, more preferably at most 10 wt % of the particles or even at most 5 wt % of the particles.

In a further embodiment, the silicon concentration of the dried granulate is in the range of 0.002 wt % to 2.0 wt %. Preferably, the silicon concentration is at least 0.01 wt % and more preferably at least 0.1 wt %, so as to limit the granulate volume to arrive at a daily dose known from clinical studies. Most preferably, the silicon concentration is higher than 0.5% w/w. The latter can be achieved by combining the silicon compound with a stabilizer, such as for instance a choline compound. In one advantageous embodiment, the high silicon concentrations of at least 0.5% w/w in the granulate is achieved by using orthosilicic acid and/or oligomers thereof as the silicon compound.

In a preferred embodiment, the generated granules are dried subsequent to their formation to a predefined degree of moisture. Such a degree of moisture is for instance at most 5 wt %, although a moisture level of at most 4 wt % or at most 3 wt % could be chosen alternatively.

According to an important embodiment, the granulate is a fluidized granulate. More particularly, it is obtainable by the method comprising the steps of (1) providing a liquid formulation of the silicon compound; (2) Introducing a particulate carrier comprising a starch material into a fluidized bed granulator, and (3) Spraying said liquid formulation into the fluidized bed granulator during operation thereof, wherein carrier particles agglomerate to granules with the liquid formulation acting as a binder. The fluidized bed granulation process ensures a uniform distribution of the liquid silicon formulation through the carrier material. Furthermore, good size distributions have been found, and the fluidization process results in granulates with a relatively low density and porosity, which is deemed advantageous for the dissolution (including the generation of a colloidal solution, which is formally a—dilute—suspension). This embodiment is particularly important in combination with the use of orthosilicic acid and/or oligomers as the silicon compound and the presence of a stabilizing agent for the silicon compound, and more particularly a choline compound as the stabilizing agent. It has turned out more difficult to create a granulate with uniform granule size with other wet granulation methods for this specific silicon compound with its stabilizing agent.

In a preferred embodiment, the granulate of the invention has a density in the range of 0.25-060 g/cm³, more preferably 0.30-0.55 g/mol, such as 0.33-0.36 g/cm³ or 0.40-0.53 g/mol. This density is clearly lower than densities obtained with extrusion-spheronisation as this typically results in a density above 0.75 g/cm³.

In a preferred implementation, the drying step occurs in the fluidized bed granulator in which the granules are generated. The 3 different steps of spraying, granulation and drying can be performed by fluidized bed granulation, and are in one implementation performed in a single granulator unit. Such fluidized bed granulation units are known per se, for instance from Glatt, with a variety of accessories for different process steps. The fluidized bed granulation unit usually comprises a spray nozzle that can be adjusted as to position and spray rate. Preferably, use is made of a so-called top nozzle. Suitable spray rates are in the range of 500-2000 g/min.

In a further embodiment, the obtained granules may be provided with a coating, which is preferably applied by fluidized bed granulation. If so desired, such a coating may be applied in the same fluidized bed granulation process in a single unit. The coating can be done to change the flavor or the aroma, to protect against oxidation, to change the visual appearance or for enteric coating. Examples of coatings are film coatings, enteric coatings delayed release coatings, hot melt coatings.

In again a further embodiment, the fluidized bed granulation is carried out with a carrier gas, preferably air, which is heated to above room temperature. A preferred temperature of the carrier gas is at least 50° C. up to 120° C., and preferably in the range of 70-100° C. The heated carrier gas further leads to drying of the material. In a preferred embodiment 25-40 wt % stabilized silicic acid is sprayed on 60-75 wt. % carrier material, such as modified starch, for instance esterified starch. Several types of modified starch can be combined to alter the particle size distribution of the obtained granulate. A preferred ratio is 1:2 between the liquid stabilized silicic acid formulation and the carrier material.

In one further embodiment, the granulate is dosed and mixed in beverages and liquid foods. Thus, in one embodiment, the granulate of the invention is blended with at least one of nutrients, plant based extracts, proteins and a variety bioactive molecules and then packaged. Such blends are also known under the name of "Superfood". Preferably, use is made of a granulate with a particle size distribution such that at least 90 wt % and preferably at least 95 wt % or even 100% of the particles has a diameter of at most 600 µm. Such a specific particle size distribution makes it possible to obtain a perfect blending. The absence of large particles (>600 µm) minimizes the risk of segregation of the blend components.

A customer can prepare the nutritional composition by mixing the blend and/or the granulate with water, dairy products (liquid such as milk and semi-liquid such as yoghurt), juices, protein drinks or other beverages before consumption. Alternatively, the granulate may be packed in sachets or stick packs or another type of unidose packaging. The content is mixed with beverages and/or (semi-)liquid food and immediately consumed. The unidose packaging facilitates consumers to take the product with them when travelling. In a further application, the granulate is used as a raw material for use in the manufacturing of other solid dose galenic forms, e.g. tablets, chewable tablets, effervescent tablets and hard gelatin or vegetable capsules.

In a further implementation, any of such dosage form or package may include further conventional additives and nutrients, such as sweeteners; flavors; excipients such as anticaking agents; trace elements such as at least one of magnesium, boron, calcium, selenium, zinc; vitamins, such as at least one of vitamin C, vitamin D, vitamin K.

It is observed for sake of completeness that any of the above mentioned embodiments are deemed relevant for any of the aspects according to the invention.

EXAMPLES

In all examples, percentages refer to weight percentages unless otherwise expressed.

Example 1

Choline chloride is treated with dry hydrochloric acid. Silicon (IV) tetrachloride is added to the formed choline solution (ratio SiCl4 versus choline chloride: 1 mol per 1 to 5 mol). The resulting solution is hydrolyzed by adding water (ice/ice water) while cooling within a temperature range of −10 to −30° C. The solution is neutralized by adding sodium hydroxide and maintaining the temperature below 0° C. The final pH is between 1-1.5. The pH was measured with a pH analyser commercially available from Stratos, type MS A405, Knick, equipped with a Memosens pH electrode with a Ag/AgCl2 reference system and liquid KCl electrolyte. Following purification by active carbon, the precipitate is removed by filtration together with the active carbon. The water concentration is reduced by distillation under vacuum until a preparation is obtained containing 2.0-4% silicon by volume and 60-80% choline chloride by weight and 15-30% water by weight. Precipitation which is formed during distillation is removed by filtration.

A mixture of 65,67% sodium starch octenyl succinate (Emarusta Al, Matsutani Chemical Industry Co. Ltd., Japan) and 1% tricalciumphosphate is added to a Flow coater FLO-120 (Freund Bldg, Japan) fluidized bed system. A fluid bed granulation process is started by setting the temperature of the inlet air at 85° C. and spraying 33,33% liquid choline-stabilized silicic acid on the modified starch when the product has reached a temperature of 50° C. Following spraying, drying is automatically started of the fluidized granules in the FLO-120 unit at a product temperature of 50° C. until a water content of less than 3% is obtained in the granules. An example of the particle size distribution, measured by sieving analysis, is given in table 1, illustrating that 96% of the particles have a size smaller than 595 μm (30 mesh). The density is between 0.408 and 0.525 g/ml. The dried granules have an elemental silicon concentration between 0.75% and 1.5% (w/w) as measured by graphite furnace atomic absorption spectrometry (GFAAS).

TABLE 1

Sieve analysis of choline stabilized silicic acid granules containing only sodium starch octenyl succinate as the carrier.

| Mesh (micron) | % of particles retained on sieve |
| --- | --- |
| 16 (1190) | 0 |
| 22 (761) | 1 |
| 30 (595) | 3 |
| 42 (380) | 10 |
| 60 (250) | 16 |
| 83 (187) | 25 |
| 100 (145) | 16 |
| 140 (105) | 24 |
| 200 (74) | 5 |

Figure 1B:
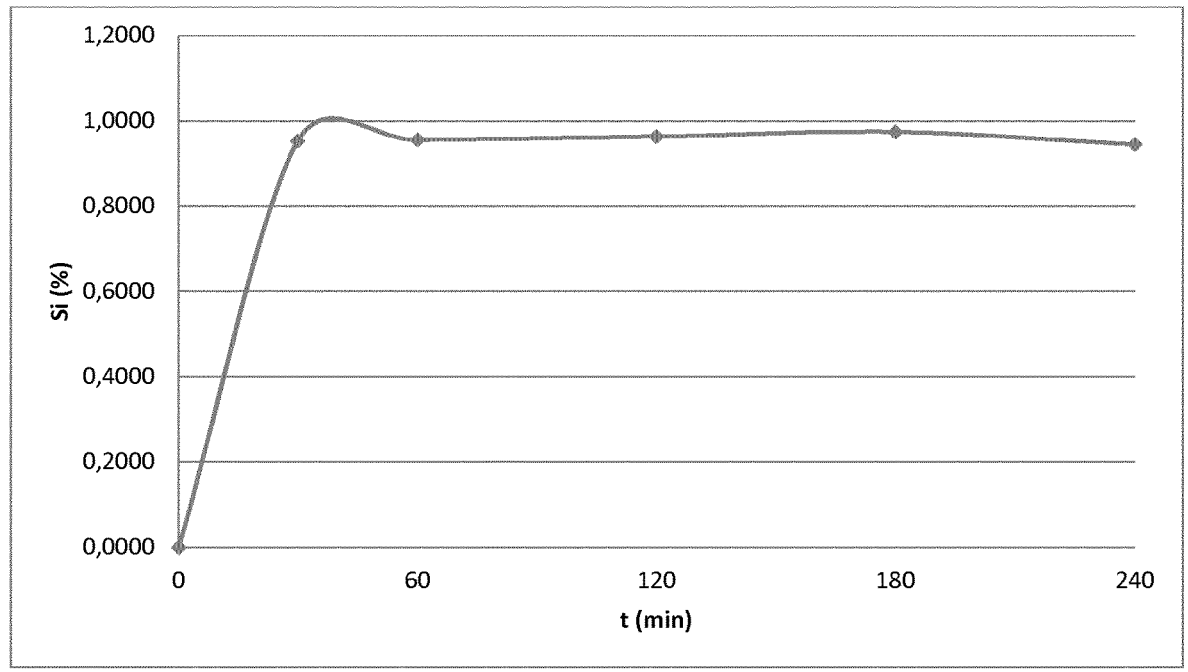
FIG. 1B shows the silicon concentration of dissolution medium measured by the colorimetric molybdenum blue method (specific for monomeric silicic acid). 500 mg stabilized silicic acid granules (lot I-160713) are incubated in a dissolution apparatus, using 500 ml dissolution medium, at 37° C. and 1000 rpm mixing speed. The silicon concentration after 240 minutes is 0.95% (colorimetry) w/V.

The dried granules have an elemental silicon concentration between 0.75% and 1.5% (w/w) as measured by graphite furnace atomic absorption spectrometry. Surprisingly, the analysis of a dissolution medium containing 500 mg granules in 500 ml dissolution medium, shows an identical profile when analyzed with GFAAS or the molybdenum blue colorimetric method (see FIG. 1). The latter is only reactive for monomeric silicic acid. This indicates that the granulation process does not result in polycondensation of stabilized silicic acid and that it is rapidly released in an aqueous environment from the starch carrier.

The granules show excellent stability as the concentration of silicon measured by the colorimetric molybdenum blue method does not change significantly when incubated in a sealed container at 40° C. and 75% relative humidity for 6 months (see table 2).

TABLE 2

Stability of choline stabilized silicic acid granules incubated at 40° C. and 75 RH in a sealed container.

| Incubation time at 40° C./75% relative humidity | Silicon concentration measured with colorimetric molybdenum blue method % (w/w) |
| --- | --- |
| 0 months | 1.03 |
| 1 months | 1.07 |
| 2 months | 1.07 |
| 3 months | 1.04 |
| 4 months | 1.09 |
| 5 months | 1.09 |
| 6 months | 1.05 |

Example 2

The silicic acid granules prepared according to example 1 are mixed with sweeteners, salt and flavors using the following formula:

| INGREDIENT | AMOUNT |
| --- | --- |
| Maltitol | 64% |
| Stabilized silicic acid granules | 25% |
| Sodium chloride | 0.50% |
| Citric acid | 5.25% |
| Grapefruit flavor | 3.5% |
| Lemon flavor | 1% |
| Mix of: 24% sucralose, 18% acesulfame K | 0.75% |

The blend has excellent flow properties and can be packed easily in uni-dose stick packs (4 g per stick pack). The filled stick packs were incubated at 40° C. during 6 months to test the stability of the flavored granulate. As shown in table 3, excellent stability was found and no interaction occurred between the stabilized silicic acid and the added compounds.

TABLE 3

Stability of a blend of choline stabilized silicic acid granules with sweeteners and flavors, incubated at 40° C. and 75 RH in a stick pack.

| Incubation time at 40° C./75% relative humidity | Silicon concentration GFAAS % (w/w) | Silicon concentration molybdenum blue method % (w/w) |
| --- | --- | --- |
| 0 months | 0.27 | 0.27 |
| 1 months | 0.25 | 0.24 |
| 3 months | 0.26 | 0.26 |
| 6 months | 0.26 | 0.25 |

Example 3

Choline chloride is treated with dry hydrochloric acid. Silicon (IV) tetrachloride is added to the formed choline solution (ratio SiCl4 versus choline chloride: 1 mol per 1 to 5 mol). The resulting solution is hydrolyzed by adding water (ice/ice water) while cooling within a temperature range of −10 to −30° C. The solution is neutralized by adding sodium hydroxide and maintaining the temperature below 0° C. The final pH is between 1-1.5. The pH was measured with a pH analyser commercially available from Stratos, type MS A405, Knick, equipped with a Memosens pH electrode with a Ag/AgCl2 reference system and liquid KCl electrolyte. Following purification by active carbon, the precipitate is removed by filtration together with the active carbon. The water concentration is reduced by distillation under vacuum until a preparation is obtained containing 2.0-4% silicon by volume and 60-80% choline chloride by weight and 15-30% water by weight.

Precipitation which is formed during distillation is removed by filtration.

Modified starches, i.e. Octyl-succinate starch commercially available as Capsul HS (Ingredion) and dextrin (Crystal Tex 626, Ingredion), and combinations thereof are used as carriers for liquid choline-stabilized silicic acid (ch-OSA) in a laboratory scale fluid bed apparatus type GPCG 1.1 (Glatt). The formula is given in table 4. The dry starch and dextrin are fluidized with a hot inlet air stream of 80-100° C., leading to a maximum product temperature in the range of 60–70° C. Choline-stabilized silicic acid is sprayed with a top nozzle on the carrier resulting in the formation of granules which are dried in the same apparatus until a loss on drying of less than 3.5% is obtained. Depending on the formula the density of the dried granules is between 330 and 360 g/l. Sieving analysis shows that more than 90% of particles are smaller than 600 μm (see table 5). The use of dextrin results in less dust (i.e. particles below 100 μm) which improves the processability and flowability of the obtained granulate.

TABLE 4

Formula of preparations made in the fluid bed apparatus type GPCG 1.1 (Glatt).

| Preparation | ch-OSA (g) | Capsul HS (g) | Crystal tex 626 (g) |
|---|---|---|---|
| A47-01 | 500 | 1000 | — |
| A47-03 | 750 | 1500 | — |
| A47-04 | 750 | 1000 | 500 |

TABLE 5

Sieve analysis of preparations made in the fluid bed apparatus type GPCG 1.1 (Glatt).

| Particle size | A47-01 | A47-03 | A47-04 |
|---|---|---|---|
| % > 800 μm | 0 | 0 | 2 |
| %600-800 μm | 0 | 0 | 2 |
| %400-600 μm | 4 | 0 | 6 |
| %200-400 μm | 14 | 18 | 56 |
| %100-200 μm | 48 | 70 | 34 |
| <100 μm | 34 | 12 | 0 |

Example 4

Example 3 is repeated with a mixture of 8 kg Capsul HS and 4 kg Crystal Tex 626 which is used as a carrier for 6 kg choline-stabilized silicic acid in a larger pilot scale GPCG15 system (Glatt), but using an inlet air stream of only 65° C., which results in a maximum product temperature of 53° C. Again, at these conditions the fluid bed process on a pilot scale results in a granulate with more than 90% of the particles having a size smaller than 600 μm (see table 6). Due to the use of a higher spray rate in experiment A47-06 than in experiment A47-05 within the range of 500-2000 g/mol, the granules become more coarse and very fine particles (dust, <100 μm) are eliminated.

TABLE 6

Sieve analysis of preparations made in the pilot scale fluid bed apparatus type GPCG 15 (Glatt)

| Particle size | A47-05 | A47-06 |
|---|---|---|
| % > 800 μm | 1 | 3 |
| %600-800 μm | 1 | 4 |
| %400-600 μm | 5 | 16 |
| %200-400 μm | 48 | 49 |
| %100-200 μm | 42 | 28 |
| <100 μm | 3 | 0 |

The silicon concentration of all the preparations both for labscale and pilot scale, is between 0.99 and 1.05% (w/w). The water content of the preparations is between 2 and 3% (w/w).

Example 5

Example 4 was repeated on an industrial level: 140.8 kg Capsul HS and 70.4 kg Crystal Tex 626 was used as a carrier for 105.6 kg choline-stabilized silicic acid in a GPCG 300 fluid bed system equipped with a top spray nozzle. The solid materials were heated up to 53° C. using an inlet air temperature of 65° C., followed by spraying choline-stabilized silicic acid into the fluidized bed at a spraying rate of 540-1800 g/min and 2 bar pressure. For drying a similar temperature of the inlet air was used resulting in a moisture content of the final granulate of 3-4%.

The bulk density of the resulting granules was 0.356 g/cm$^3$ and 93% of the particles had a size below 600 μm, and 94% a size of at least 125 μm. The particle size distribution is shown in Table 7, which demonstrates that the particle size distribution obtained in the experiment on industrial scale is not significantly different from the labscale experiments. The total output of the process was 293 kg granules.

Samples were taken randomly to check the homogeneity. The results which are summarized in Table 8, demonstrate formation of a homogenous product. This confirms that the industrial granulation process does not result in polycondensation of stabilized silicic acid, since GFAAS and molybdenum analysis revealed no differences in silicon concentration.

TABLE 7

Sieve analysis of granulate made on an industrial level with a fluid bed apparatus type GPCG 300 (Glatt).

| Particle size | Lot 18G26 |
|---|---|
| % > 1180 μm | 0.61 |
| %600-1180 μm | 6.3 |
| %400-600 μm | 18.1 |
| %200-400 μm | 62.3 |

TABLE 7-continued

Sieve analysis of granulate made on an industrial level
with a fluid bed apparatus type GPCG 300 (Glatt).

| Particle size | Lot 18G26 |
|---|---|
| %125-200 μm | 7.1 |
| <125 μm | 5.5 |

TABLE 8

Chemical analysis of randomly chosen samples of granulate
made in an fluid bed apparatus type GPCG 300 (Glatt).

| Sample Lot 18G26 | Silicon concentration GFAAS % (w/w) | Silicon concentration molybdenum blue method % (w/w) | Choline chloride % (w/w) | Moisture % (w/w) |
|---|---|---|---|---|
| 1 | 1.06 | 0.96 | 25.0 | 3.54 |
| 2 | 0.99 | 1.00 | 24.9 | 3.81 |
| 3 | 1.00 | 0.99 | 25.2 | 3.92 |

Example 6

Granulate obtained in example 1, was compressed into tablets, using the following formula:
200 mg choline-stabilized silicic acid granulate
90.01 mg microcrystalline cellulose
6 mg calcium stearate
3.99 mg tricalciumphosphate
3 mg Shellac The tablet was found to be stable when packed in alu/alu foil and incubated at 40° C. and 75% relative humidity for 3 months since GFAAS and molybdenum analysis revealed no differences in silicon concentration and disintegration time remained similar over time (table 9).

TABLE 9

Stability of tablets packed in sealed alu/alu bags
and incubated at 40° C. and 75% relative humidity.

|  | baseline | 1 month | 3 months |
|---|---|---|---|
| Silicon concentration GFAAS mg/tablet | 2.06 | 2.03 | 1.94 |
| Silicon concentration molybdenum blue method mg/tablet | 1.90 | 1.95 | 1.94 |
| Desintegration time | 47'0" | 52'30" | 48'55" |

Example 7

Granulate obtained in example 1, was compressed into chewable tablets, using the following formula:
500 mg choline-stabilized silicic acid granulate
1.25 g microcrystalline cellulose
650 mg advantose
10 mg sucralose
300 mg maltodextrin
100 mg magnesiumstearate
30 mg ginger-lemon flavor
30 mg banana flavor
45 mg ascorbic acid The tablet was found to be stable when packed in alu/alu foil and incubated at 40° C. and 75% relative humidity for 3 months since GFAAS and molybdenum analysis revealed no differences in silicon concentration which also remained unchanged over time (table 10).

TABLE 10

Stability of chewable tablets packed in sealed alu/alu
bags and incubated at 40° C. and 75% relative humidity.

|  | baseline | 1 month | 3 months |
|---|---|---|---|
| Silicon concentration GFAAS mg/tablet | 5.05 | 4.99 | 5.00 |
| Silicon concentration molybdenum blue method mg/tablet | 4.98 | 4.89 | 4.90 |
| Desintegration time | 47'30" | 52'30" | 48'55" |

The invention claimed is:

1. A water-soluble silicon-containing granulate for dissolution in a liquid or a beverage comprising:
a silicon compound, wherein the silicon compound is chosen from the group of orthosilicic acid, an oligomer of the orthosilicic acid, monomethyltrisilanol, and combinations thereof;
a stabilizing agent inhibiting polymerisation of the silicon compound; and
a cold-water soluble starch;
wherein the granulate is a fluidized granulate obtained from fluidized bed granulation and has a density in the range of 0.25 to 0.60 g/cm$^3$.

2. The water soluble granulate of claim 1, wherein the stabilizing agent is chosen from the group of amino acids, peptides, organic acids, a phenolic compound, a polyphenolic compound, polyalcohols, quaternary ammonium compounds, and aldehydes.

3. The water-soluble granulate according to claim 2, wherein the quaternary ammonium compound is a choline compound.

4. The water-soluble granulate according to claim 3, wherein the choline compound is selected from the group consisting of choline chloride, choline bitartate, choline hydroxide, choline dihydrogen citrate, choline 2-4-dichlorophenoxyacetate (2,4 D choline salt), choline acetate, choline carbonate, choline citrate, choline tartate, choline lactate, choline dibutyl phosphate, choline O,O'-diethyl dithiophosphate, choline dihydrogen phosphate, and choline phosphate.

5. The water-soluble granulate of claim 1, wherein the granulate has a density in the range of 0.30-0.60 g/cm$^3$.

6. The water-soluble granulate of claim 1, wherein at least 90 wt % of the granulate has a diameter of at most 600 μm, and at least 80 wt % of the granulate has a diameter of at least 100 μm.

7. The water-soluble granulate of claim 1, wherein the cold-water soluble starch comprises a starch that has been chemically modified.

8. The water-soluble granulate as claimed in claim 7, wherein the cold-water soluble starch has been chemically modified with an organic acid into an esterified starch or a salt of the esterified starch.

9. The water-soluble granulate according to claim 8, wherein the starch is octenyl succinate starch or an alkali salt thereof.

10. The water-soluble granulate of claim 8, wherein the cold-water soluble starch comprises a combination of said esterified starch or salt thereof and a dextrin or a maltodextrin.

11. The water-soluble granulate of claim 1, wherein the concentration of elemental silicon is in the range of 0.5-2.0 wt %, based on the total weight of the granulate.

12. The water-soluble granulate according to claim 1, wherein the silicon compound is orthosilicic acid or an oligomer thereof.

13. A method of preparing a water-soluble silicon containing granulate comprising the steps of:
providing a liquid formulation comprising a silicon compound and a stabilizing agent inhibiting polymerization of the silicon compound, wherein the silicon compound is chosen from the group of orthosilicic acid, an oligomer of the orthosilicic acid, monomethyltrisilanol, and combinations thereof;
providing a cold-water soluble starch; and
mixing the liquid formulation and the cold-water soluble starch, so that the silicon compound adsorbs onto the cold-water soluble starch and thereby forming the granulate,
wherein the cold-water soluble starch is provided into a fluidized bed granulator to be fluidized, and wherein the liquid formulation is sprayed into the fluidized bed granulator during operation thereof, wherein the cold-water soluble starch agglomerates to form the granulate with the liquid formulation acting as a binder, and wherein the granulate has a density in the range of 0.25 to 0.60 g/cm$^3$.

14. The method as claimed in claim 13, wherein the stabilizing agent is chosen from the group of amino acids, peptides, organic acids, a phenolic compound, a polyphenolic compound, polyalcohols, quaternary ammonium compounds, and aldehydes.

15. The method according to claim 14, wherein the quaternary ammonium compound is a choline compound.

16. The method according to claim 15, wherein the choline compound is selected from the group consisting of choline chloride, choline bitartate, choline hydroxide, choline dihydrogen citrate, choline 2-4-dichlorophenoxyacetate (2,4 D choline salt), choline acetate, choline carbonate, choline citrate, choline tartate, choline lactate, choline dibutyl phosphate, choline O,O'-diethyl dithiophosphate, choline dihydrogen phosphate or choline phosphate.

17. A granulate obtained by the method of claim 13.

18. A galenic or nutritional composition comprising the granulate as claimed in claim 1.

19. A food supplement or feed supplement comprising water, beverage, other aqueous solution, and/or other aqueous dispersion having dispersed and/or dissolved therein the galenic or nutritional composition as claimed in claim 18.

* * * * *